United States Patent
Praet et al.

(10) Patent No.: US 11,932,072 B2
(45) Date of Patent: Mar. 19, 2024

(54) SUSPENSION CONTROL SYSTEM AND METHOD WITH EVENT DETECTION BASED ON UNSPRUNG MASS ACCELERATION DATA AND PRE-EMPTIVE ROAD DATA

(71) Applicant: DRIV Automotive Inc., Southfield, MI (US)

(72) Inventors: Kylian Praet, Antwerp (BE); Miguel Dhaens, Lommel (BE)

(73) Assignee: DRIV Automotive Inc., Northville, MI (US)

( * ) Notice: Subject to any disclaimer, the term of this patent is extended or adjusted under 35 U.S.C. 154(b) by 506 days.

(21) Appl. No.: 17/194,601

(22) Filed: Mar. 8, 2021

(65) Prior Publication Data
US 2022/0281280 A1   Sep. 8, 2022

(51) Int. Cl.
*B60G 17/0165*   (2006.01)
*B60G 17/018*   (2006.01)
*B60G 17/019*   (2006.01)

(52) U.S. Cl.
CPC ....... *B60G 17/0165* (2013.01); *B60G 17/018* (2013.01); *B60G 17/01908* (2013.01);
(Continued)

(58) Field of Classification Search
CPC .............. B60G 17/0165; B60G 17/018; B60G 17/01908; B60G 17/06; B60G 2400/102;
(Continued)

(56) References Cited

U.S. PATENT DOCUMENTS 7,195,250 B2   3/2007   Knox et al.
8,918,253 B2   12/2014   Norton et al.
(Continued)

FOREIGN PATENT DOCUMENTS

CN    109353179 A    2/2019
DE    102013210553 A1    12/2014
(Continued)

OTHER PUBLICATIONS

International Search Report and Written Opinion regarding International Patent Application No. PCT/US2022/018085, dated Jun. 16, 2022.

*Primary Examiner* — Carl C Staubach
(74) *Attorney, Agent, or Firm* — Harness, Dickey & Pierce, P.L.C.

(57) ABSTRACT

A suspension control system including a suspension control unit, an unsprung mass accelerometer positioned at each wheel of the vehicle, and a global positioning system. The suspension control unit determines if a road irregularity, such as a bump or pothole, is approaching based on vehicle location data, provides pre-emptive road event classification information for the approaching road irregularity, and sets both a threshold based suspension pre-setting and a threshold based pre-trigger based on the pre-emptive road event classification information. The suspension control unit monitors the unsprung mass acceleration data, calculates a slope value for the unsprung mass acceleration data, and activates a suspension control action if the unsprung mass acceleration data exceeds the threshold based pre-trigger and the slope value exceeds a maximum slope value.

20 Claims, 3 Drawing Sheets

(52) U.S. Cl.
CPC .. *B60G 2400/102* (2013.01); *B60G 2400/204* (2013.01); *B60G 2400/821* (2013.01); *B60G 2401/16* (2013.01); *B60G 2500/10* (2013.01); *B60G 2600/1877* (2013.01)

(58) Field of Classification Search
CPC ........ B60G 2400/204; B60G 2400/821; B60G 2401/16; B60G 2500/10; B60G 2600/1877
See application file for complete search history.

(56) References Cited

U.S. PATENT DOCUMENTS

| | | | |
|---|---|---|---|
| 8,930,074 B1 | 1/2015 | Lin | |
| 8,996,249 B2 | 3/2015 | Lu et al. | |
| 9,278,599 B2* | 3/2016 | Hirao | B60G 17/06 |
| 9,662,955 B2* | 5/2017 | Popham | B60G 17/0165 |
| 10,286,745 B2 | 5/2019 | Russell et al. | |
| 10,486,485 B1 | 11/2019 | Levinson et al. | |
| 11,376,915 B2* | 7/2022 | Ohno | B60G 17/0162 |
| 2004/0046335 A1* | 3/2004 | Knox | B60G 17/0165 |
| | | | 280/5.5 |
| 2008/0234900 A1* | 9/2008 | Bennett | B60G 17/0195 |
| | | | 701/48 |
| 2009/0143936 A1* | 6/2009 | Craig | B60W 40/02 |
| | | | 701/37 |
| 2014/0195112 A1* | 7/2014 | Lu | B60G 17/015 |
| | | | 703/2 |
| 2016/0121685 A1* | 5/2016 | Giovanardi | B60G 17/0165 |
| | | | 701/38 |
| 2016/0318365 A1* | 11/2016 | Sivaraman | G01S 17/88 |
| 2017/0151850 A1* | 6/2017 | Deigmöller | H04N 13/204 |
| 2017/0349022 A1* | 12/2017 | Masamura | B60G 17/015 |
| 2018/0015801 A1 | 1/2018 | Mohamed et al. | |
| 2018/0079272 A1 | 3/2018 | Aikin | |
| 2018/0154723 A1* | 6/2018 | Anderson | H02K 11/33 |
| 2019/0023094 A1 | 1/2019 | Panagis et al. | |
| 2019/0232748 A1 | 8/2019 | Mohamed et al. | |
| 2021/0031585 A1* | 2/2021 | Toyohira | B60G 17/0165 |

FOREIGN PATENT DOCUMENTS

| | | |
|---|---|---|
| DE | 102017208239 A1 | 11/2018 |
| JP | 2020132063 A | 8/2020 |
| WO | WO-2020081980 A1 | 4/2020 |

* cited by examiner

SUSPENSION CONTROL SYSTEM AND METHOD WITH EVENT DETECTION BASED ON UNSPRUNG MASS ACCELERATION DATA AND PRE-EMPTIVE ROAD DATA

FIELD

The present disclosure relates generally to vehicle suspension systems and more particularly to suspension control systems and methods that control adaptive suspension components using unsprung mass acceleration data and pre-emptive road data.

BACKGROUND

The statements in this section merely provide background information related to the present disclosure and may not constitute prior art.

The tuning of traditional dampers in a vehicle suspension system involved selecting damper settings that would provide an acceptable trade-off between ride comfort and body control. Today, an increasing number of vehicles are being equipped with suspension systems that include adaptive dampers, which are dynamically controlled based on data from on-board sensors to make on-the-fly changes to the damper settings in real time. For example, such systems can make dynamic changes to the rebound and compression damping settings of the adaptive dampers, reducing the trade-offs associated with static damper settings. With the advent of in-vehicle navigation and forward looking vehicle sensors, data from these devices is starting to be used to control adaptive damping settings as well, but the direct use of such data makes it challenging to create a repeatable response from the vehicle's suspension system through pre-emptive suspension control.

While information concerning discrete road irregularities such as bumps and potholes may be included in the mapping layer of a GPS-based navigation system to warn of approaching road events, the use of on-board sensors is still needed to verify this information and determine if the vehicle is on course to actually travel over (i.e., hit) the bump or pothole. For typical cost effective forward looking sensors that scan the road scene in front of the vehicle, it is especially challenging to properly capture downward road irregularities, such as potholes, due to the typically shallow angle of incidence of the electromagnetic waves that originate from the forward looking sensors. The self-shadowing effect created by the shallow angle of incidence makes it difficult to obtain an estimate of the position of the initial drop and the depth of an approaching road irregularity. Also, the rear edge of the approaching road irregularity is typically only partially visible because of the same effect. Hence, obtaining an accurate and reliable estimate of the geometric profile of a downward road event is difficult, especially when using cost effective sensors targeted for mass production, which usually obtain coarser information from the road scene (e.g., lower spatial resolution and accuracy). Even in the case of upward road irregularities, data from typical cost effective forward looking sensors can have limited accuracy and therefore introduce a level of uncertainty about the location and size of the irregularity.

Additionally, information concerning downward and upward road events needs to be processed quickly if it is to be used for pre-emptive state estimation and suspension control. On top of that, such systems need to be scalable to the capabilities adaptive dampers provide. Hence, there is a need for an alternative approach to capture downward road events and combine them with the upward road event detections from the forward looking sensor(s).

SUMMARY

This section provides a general summary of the disclosure, and is not a comprehensive disclosure of its full scope or all of its features.

In accordance with one aspect of the present disclosure, a suspension control system is provided that includes a suspension control unit (SCU), an unsprung mass accelerometer positioned at each wheel of the vehicle, and a global positioning system (GPS) module. Each unsprung mass accelerometer is arranged in electronic communication with the suspension control unit (SCU) and is configured to provide unsprung mass acceleration data to the suspension control unit (SCU). The global positioning system (GPS) module is arranged in electronic communication with the suspension control unit (SCU) and is configured to provide vehicle location data to the suspension control unit (SCU). The suspension control unit (SCU) is programmed to determine if a road event, such as an impact caused by a bump or pothole, is approaching based on the vehicle location data and provide pre-emptive road event classification information for an approaching road event. The pre-emptive road event classification information may be based on, for example, a classification index that grades road events based on the expected severity of the impact on the suspension system. The suspension control unit (SCU) is further programmed to set both a threshold based suspension pre-setting and a threshold based pre-trigger based on the pre-emptive road event classification information. The threshold based suspension pre-setting maybe, for example, a particular setting for an adaptive suspension component that corresponds to a particular classification of road event and may include specific settings or mappings for compression and rebound damping.

The suspension control unit (SCU) is programmed to monitor the unsprung mass acceleration data and arm an event detection flag if the unsprung mass acceleration data exceeds the threshold based pre-trigger. The suspension control unit (SCU) is further programmed to calculate a slope value for the unsprung mass acceleration data. The suspension control unit (SCU) is configured to generate a control signal that changes the adaptive suspension settings of the adaptive suspension component(s) if both the unsprung mass acceleration data exceeds the threshold based pre-trigger and the slope value calculated by the suspension control unit (SCU) exceeds a maximum slope value.

In accordance with another aspect of the present disclosure, the suspension control system includes one or more forward looking sensors arranged in electronic communication with the suspension control unit (SCU) and configured to provide sensor data about approaching road irregularities, such as a bump or a pothole, to the suspension control unit (SCU). By way of example and without limitation, the forward looking sensor(s) could be LiDAR, RADAR, optical sensors like a camera, or acoustic sensors like an ultrasonic sensor. In accordance with this aspect of the present disclosure, the suspension control unit (SCU) is programmed to determine if a road event is approaching based on the sensor data and provide pre-emptive road event classification information for an approaching road event.

In accordance with another aspect of the present disclosure, a method of controlling a suspension control system is provided that includes the steps of receiving unsprung mass acceleration data from an unsprung mass accelerometer positioned at each wheel of the vehicle, retrieving vehicle location data from a global positioning system (GPS) module, establishing a connection to a cloud-based network, and retrieving pre-emptive event classification data from the cloud-based network.

The method includes the steps of determining if a road event is approaching and generating pre-emptive road event classification information based at least in part on the vehicle location data from the global positioning system (GPS) module and the pre-emptive event classification data from the cloud connection. The method includes the steps of setting both a threshold based suspension pre-setting and a threshold based pre-trigger for an approaching road event based on the pre-emptive road event classification information. The method then proceeds with the steps of monitoring the unsprung mass acceleration data and calculating a slope value for the unsprung mass acceleration data. The method proceeds with the step of activating a suspension control action for the road event if the unsprung mass acceleration data exceeds the threshold based pre-trigger and the slope value that was calculated for the unsprung mass acceleration data exceeds a maximum slope value.

Monitoring the unsprung mass acceleration data from each wheel of the vehicle enables integrated pre-emptive state estimation and an advanced suspension control framework with a fast enough response time to change the suspension settings between the time when a wheel initially drops into a downward road irregularity and the time when the wheel hits the rear edge of the road irregularity. This fast response time is achieved without a need for substantial on-board computing resources because road events are pre-emptively identified and classified as the vehicle approaches the location of the road irregularity and pre-selects a threshold based suspension pre-setting for the road event based on the pre-emptive classification of the road event. This allows the suspension control system to quickly switch from the threshold based suspension pre-setting to a dynamic suspension control action the moment a downward drop of the wheel is detected when the unsprung mass acceleration data exceeds both a threshold based pre-trigger that is set based on the pre-emptive classification of the road event and a maximum slope value. Furthermore, the suspension control system and associated control method described herein can be adapted to a wide variety of the road scanning and damper technologies to improve ride comfort and road safety without substantial increases in hardware cost. Furthermore, the information obtained by the suspension control system described herein can be used with other preview sensor inputs to improve dynamic cloud-based mapping layers with accurate and current information about road irregularities.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
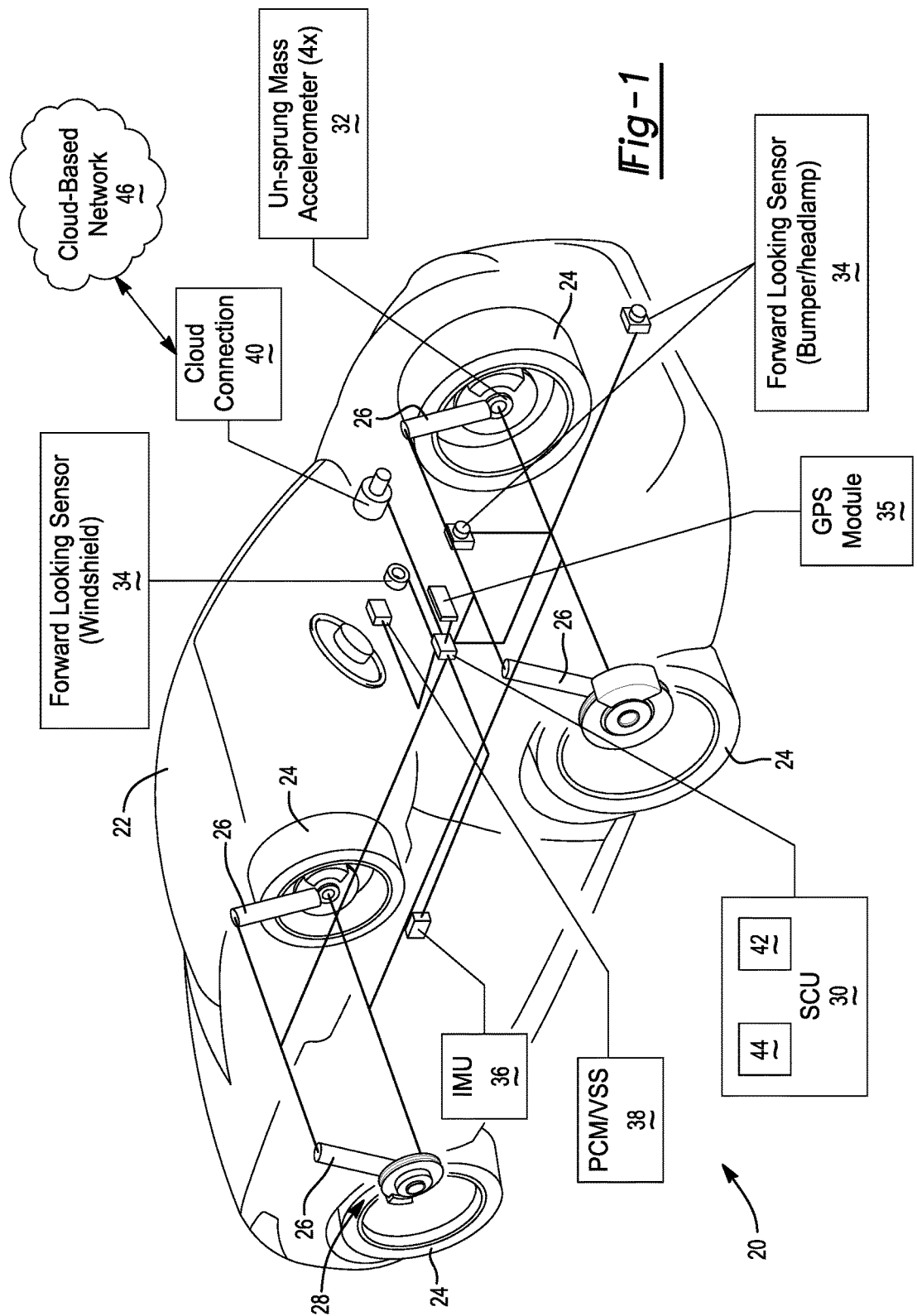
FIG. 1 is a front perspective view of a vehicle equipped with an exemplary suspension control system in accordance with the present disclosure.

Referring to the Figures, wherein like numerals indicate corresponding parts throughout the several views, a suspension control system 20 is illustrated along with an associated control method.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "unit" may be replaced with the term "circuit." The term "module" or the term "unit" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module or unit may include one or more interface circuits. In some examples, the interface circuits may include wired or wireless interfaces that are connected to a local area network (LAN), the Internet, a wide area network (WAN), or combinations thereof. The functionality of any given module or unit of the present disclosure may be distributed among multiple modules or units that are connected via interface circuits. For example, multiple modules or units may allow load balancing. In a further example, a server (also known as remote, or cloud) module or unit may accomplish some functionality on behalf of a client module or client unit. In addition, the term "electronic communication" refers to components that are capable of passing signals, data, and/or information to one another through wired and/or wireless connections.

The term code and the term programming logic, as used herein, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory and the term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are non-volatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

With reference to FIG. 1, an exemplary vehicle 22 is illustrated that has been equipped with the suspension control system 20 of the present disclosure. The vehicle 22 in FIG. 1 has been illustrated as an automobile; however, it should be appreciated that the suspension control system 20 described herein is not limited to automobiles and may be used in other types of vehicles. In the illustrated example, the vehicle 22 has four wheels 24 with one adaptive suspension component 26 per wheel 24. Together the four adaptive suspension components 26 form a suspension system 28 of the vehicle 22, which may be combined with other components such as wheel knuckles, swing arms, control arms, springs, and other components (not shown). As the term is used here, adaptive suspension components 26 refers to suspension components that are dynamically adjustable (i.e., adjustable on-the-fly) to change how the suspension system 28 operates. The term adaptive suspension components 26 includes adaptive dampers, adaptive linear actuators, adaptive springs (including adaptive coil springs and air springs). For example, in accordance with one embodiment, the adaptive suspension components 26 may be Skyhook dampers (i.e., adjustable dampers which are controlled through the Skyhook control principle). The suspension control system 20 described herein is designed to control adaptive suspension components 26, which have one or more adaptive suspension settings where certain operating characteristics of the adaptive suspension components 26 can be changed by electronic control, such as the compression and rebound damping settings or maps for the adaptive suspension components 26.

The suspension control system 20 includes a suspension control unit (SCU) 30, unsprung mass accelerometers 32 positioned at each wheel 24 of the vehicle 22, forward looking sensors 34 mounted to the vehicle 22, an inertial measurement unit (IMU) 36, a powertrain control module (PCM) 38 mounted in the vehicle 22, and a cloud connection 40 or other form of wireless communication interface. The suspension control unit (SCU) 30 includes one or more processors 42 configured to control the adaptive suspension settings of the adaptive suspension components 26 and memory 44 that programmed with one or more default suspension settings.

The unsprung mass accelerometers 32 may be mounted to the wheel knuckle, axle, control arm, swing arm, damper, or other components that support and move up and down with the wheel 24 as the wheel 24 travels over road irregularities, such as bumps and potholes. Alternatively, the unsprung mass accelerometers 32 may be mounted to the wheels 24 themselves. The unsprung mass accelerometers 32 are arranged in electronic communication with the suspension control unit (SCU) 30 and are configured to provide unsprung mass acceleration data to the suspension control unit (SCU) 30.

Although a wide variety of different sensor types and combinations may be used, in the illustrated example, two forward looking sensors 34 are mounted to the vehicle 22. One of the forward looking sensors 34 is mounted near the bumper/headlamps of the vehicle 22 while the other forward looking sensor 34 is mounted near the windshield of the vehicle 22. The forward looking sensors 34 are arranged in electronic communication with the suspension control unit (SCU) 30 and are configured to provide sensor data about approaching road irregularities to the suspension control unit 30 (SCU). By way of example and without limitation, the forward looking sensor 34 could be LiDAR, RADAR, an optical sensor like a camera, or an acoustic sensor like an ultrasonic sensor.

The suspension control system 20 also includes a global positioning system (GPS) module 35, an inertial measurement unit (IMU) 36, and a powertrain control module (PCM) 38, which are mounted in the vehicle 22 and may be shared across other systems of the vehicle 22. The global positioning system (GPS) module 35 is arranged in electronic communication with the suspension control unit (SCU) 30 and is configured to provide vehicle location data to the suspension control unit (SCU) 30. The inertial measurement unit (IMU) 36 is arranged in electronic communication with the suspension control unit (SCU) 30 and is configured to provide sprung mass acceleration data to the suspension control unit (SCU) 30. As such, the inertial measurement unit (IMU) 36 may include one or more accelerometers that are mounted to the vehicle body for measuring linear accelerations of the sprung mass of the vehicle 22 and one or more gyroscopes or magnetometers for providing tilt measurements and heading references. The powertrain control module (PCM) 38 is arranged in electronic communication with a vehicle speed sensor (VSS) and the suspension control unit (SCU) 30 and is configured to provide vehicle speed data to the suspension control unit (SCU) 30. Although other forms of sensors may be used, the vehicle speed sensor (VSS) may be a wheel speed sensor, for example. Alternatively, the suspension control unit (SCU) 30 may receive the vehicle speed data directly from the vehicle speed sensor (VSS) or the global positioning system (GPS) module 35.

The cloud connection 40 of the suspension control system 20 is arranged in electronic communication with the suspension control unit (SCU) 30 and a cloud-based network 46. The cloud connection 40 may be provided in the form of a transceiver that is configured to communicate with one or more cellular networks, WiFi networks, and/or communication satellites, for example. The cloud connection 40 enables the suspension control unit (SCU) 30 to communicate wirelessly with the cloud-based network 46 where information and data related to road surfaces, vehicle operating parameters, and suspension settings can be stored and subsequently retrieved. For example, the cloud connection 40 in the illustrated example is configured to provide road classification data and pre-emptive event classification data that is stored in the cloud-based network 46 to the suspension control unit (SCU) 30 based upon the vehicle location data provided by the global positioning system (GPS) module 35 of the vehicle 22.

The road classification data may be based on, for example, a classification index that grades a stretch of road (i.e., a road or road segment) based on the roughness of the road surface. For example, ISO 8608 and ISO 13473 provide industry standards for classifying the roughness of a road. The pre-emptive event classification data may be based on, for example, another classification index that grades specific road events (e.g., impacts from bumps and potholes) based on the severity of the impact the road event is expected to have on the vehicle 22. Alternatively, the road classification data and/or pre-emptive event classification data may be provided as a map layer or overlay to navigational mapping used by the global positioning system (GPS) module 35. Because many vehicles may be connected to the cloud-based network 46, the road classification data and pre-emptive event classification data may be based, at least in part, on information or data that is transmitted to the cloud-based network 46 by other vehicles after traveling over and/or encountering a particular stretch of road or road event.

Figure 2:
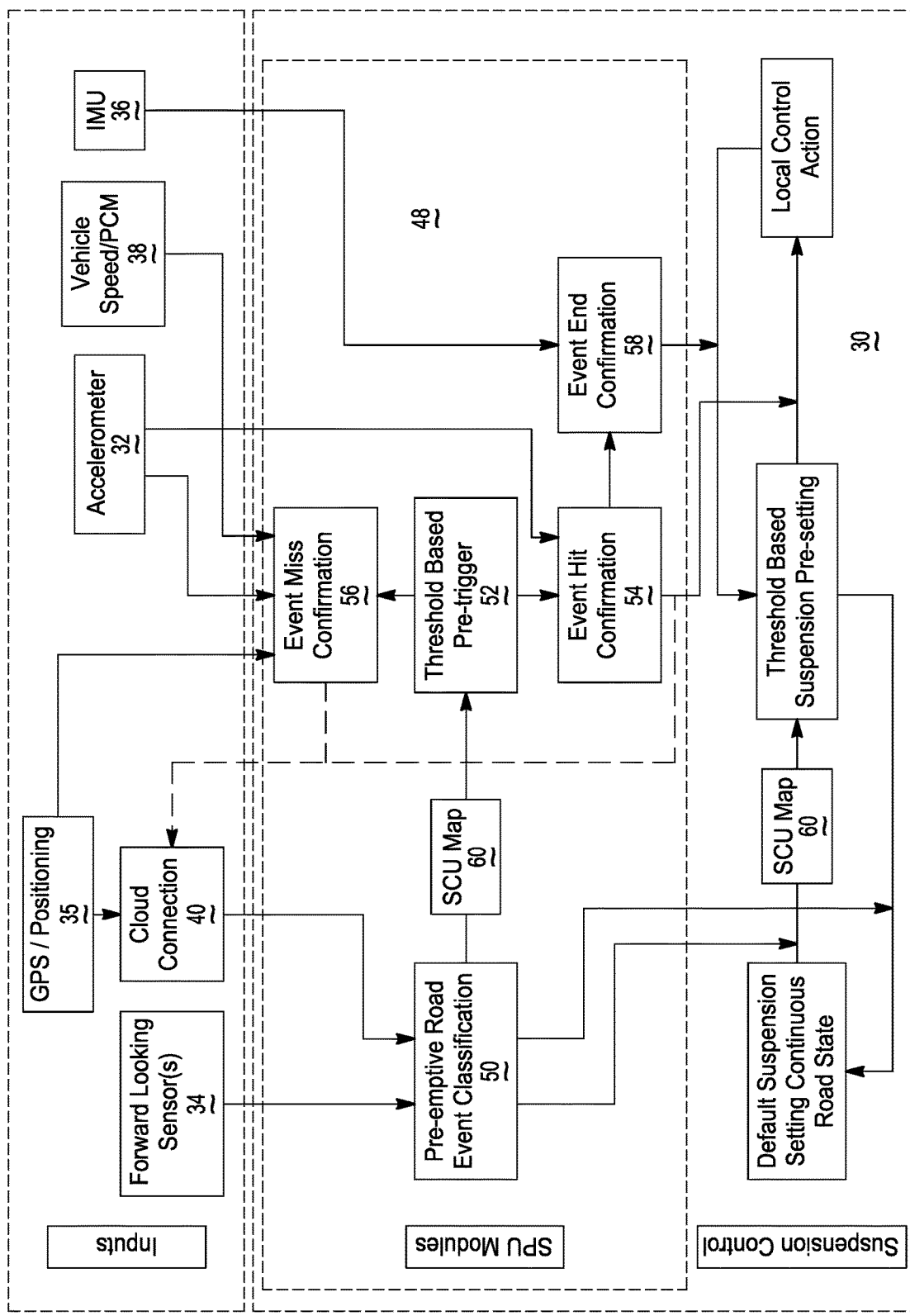
FIG. 2 is a block diagram illustrating the exemplary suspension control system of the present disclosure.

With reference to FIG. 2, the processor 42 of the suspension control unit (SCU) 30 has a plurality of suspension processing unit (SPU) modules 50, 52, 54, 56, 58, 60, each of which includes programming logic. For example, in the illustrated embodiment, the suspension processing unit (SPU) 48 includes a pre-emptive road event classification module 50, a threshold based pre-trigger module 52, an event hit confirmation module 54, an event miss confirmation module 56, an event end confirmation module 58, a suspension control unit (SCU) map module 60. The processor 42 of the suspension control unit (SCU) 30 is configured to receive the vehicle location data from the global positioning system (GPS) module 35 and road classification data from the cloud connection 40 and is programmed to determine if the vehicle 22 is traveling on a classified stretch of road. Once that determination is made, the processor 42 of the suspension control unit (SCU) 30 is programmed to retrieve and initialize a road specific suspension setting if the stretch of road the vehicle 22 is traveling on is classified. The road specific suspension settings, which the processor 42 may retrieve from the memory 44 of the suspension control unit (SCU) 30 and/or the cloud-based network 46, may be provided in the form of specific settings or mappings for compression and rebound damping that are selected based on the road classification data using a look-up table, for example.

More specifically, the pre-emptive road event classification module 50 of the suspension processing unit (SPU) 48 is configured to receive the sensor data about approaching road irregularities from the forward looking sensor(s) 34 and the pre-emptive event classification data from the cloud connection 40 and is programmed to determine if a road event is approaching. In this way, the sensor data from the forward looking sensor(s) 34 may be used in conjunction with the pre-emptive event classification data from the cloud connection 40 or in place of the pre-emptive event classification data to identify approaching road events. When a determination is made that a road event is approaching, the pre-emptive road event classification module 50 provides pre-emptive road event classification information for an approaching road event, which may include information that a road event is approaching, the expected location, distance, or time of the road event, and the classification for the road event.

The suspension control unit (SCU) map module 60 is configured to receive the pre-emptive road event classification information from the pre-emptive road event classification module 50 and is programmed to set a threshold based suspension pre-setting based upon the pre-emptive road event classification information. The threshold based suspension pre-setting may be provided in the form of specific pre-settings or mappings for compression and rebound damping that are selected when the pre-emptive road event classification information reaches a certain threshold or multiple threshold levels, which may be stored in the memory 44 of the suspension control unit (SCU) 30 in a look-up table, for example. The suspension control unit (SCU) map module 60 is also configured to pass the pre-emptive road event classification information to the threshold based pre-trigger module 52.

The threshold based pre-trigger module 52 is configured to receive the pre-emptive road event classification information from the suspension control unit (SCU) map module 60 and is programmed to set a threshold based pre-trigger based upon the pre-emptive road event classification information. The threshold based pre-trigger may be provided in the form of one or more acceleration value or measurement that is selected when the pre-emptive road event classification information reaches a certain threshold or multiple threshold levels, which may be stored in the memory 44 of the suspension control unit (SCU) 30 in a look-up table or stored in the cloud-based network 46 and retrieved via the cloud connection 40, for example. The suspension control unit (SCU) map module 60 is also configured to pass the pre-emptive road event classification information to the threshold based pre-trigger module 52.

The event hit confirmation module 54 of the suspension processing unit (SPU) 48 is configured to receive the threshold based pre-trigger for approaching road events from the threshold based pre-trigger module 52 and the unsprung mass acceleration data from each of the unsprung mass accelerometers 32. The event hit confirmation module 54 is programmed to monitor the unsprung mass acceleration data and arm an event detection flag if the unsprung mass acceleration data exceeds the threshold based pre-trigger. In other words, if there is a spike (i.e., peak) in the unsprung mass acceleration data that exceeds the threshold based pre-trigger, the event hit confirmation module 54 will arm the event detection flag. The processor 42 of the suspension control unit (SCU) 30 is also programmed to calculate a slope value of the unsprung mass acceleration data. The suspension control unit (SCU) 30 provides a road event hit confirmation if both the unsprung mass acceleration data exceeds the threshold based pre-trigger and the slope value calculated by the processor 42 exceeds a maximum slope value, which may be stored in the memory 44 of the suspension control unit (SCU) 30 or set using a look-up table based on the pre-emptive road event classification information. When a road event hit confirmation is made, the processor 42 of the suspension control unit (SCU) 30 activates a suspension control action for the road event, which adjusts the adaptive suspension settings in accordance with the specific settings or mappings for compression and rebound damping that are selected based on the pre-emptive road event classification information. For example, the suspension control unit (SCU) 30 may be configured to generate a control signal that changes the adaptive suspension settings of the adaptive suspension component(s) 26 if both: (1) a peak in the unsprung mass acceleration data exceeds the threshold based pre-trigger, and (2) the slope value calculated by the suspension control unit (SCU) 30 exceeds a maximum slope value, which can be monitored simultaneously.

The event end confirmation module 58 of the suspension processing unit (SPU) 48 is configured to receive a road event hit confirmation from the event hit confirmation module 54, which confirms that the vehicle 22 has encountered the road event. The event end confirmation module 58 is also configured to receive the sprung mass acceleration data from the inertial measurement unit (IMU) 36 or individual sprung mass acceleration sensors and is programmed to monitor the sprung mass acceleration data and make a road event end confirmation based on the sprung mass acceleration data, angular rate data, and/or position information. By way of non-limiting example, the event end confirmation module 58 may provide a road event end confirmation if the sprung mass acceleration data remains below a threshold value for a pre-defined period of time. Both the threshold value and the pre-defined period of time may be stored in the memory 44 of the suspension control unit (SCU) 30 as a default value or an index of values in a look-up table, retrieved from the cloud-based network 46 and passed as part of the pre-emptive event classification information. Alternatively, the pre-defined period of time may be calculated by the processor 42 of the suspension control unit (SCU) 30 based at least in part on the vehicle speed data. Regardless of the method, when an road event end confirmation is made, the processor 42 of the suspension control unit (SCU) 30 is programmed to check if another road event is approaching and release the threshold based pre-trigger and the threshold based suspension pre-setting if another road event is not approaching.

The event miss confirmation module 56 of the suspension processing unit (SPU) 48 is configured to receive the threshold based pre-trigger for the approaching road event from the threshold based pre-trigger module 52, the unsprung mass acceleration data from each of the unsprung mass accelerometers 32, the vehicle location data from the global positioning system (GPS) module 35, and vehicle speed data from the powertrain control module (PCM) 38. The event miss confirmation module 56 is programmed to calculate a hold time based on the vehicle location data and the vehicle speed data, monitor the unsprung mass acceleration data, and provide a road event miss confirmation if the unsprung mass acceleration data does not exceed the threshold based pre-trigger during the hold time. As an example, the hold time will generally be shorter when the vehicle speed is high and the location of the vehicle 22 is close to the expected road event when the hold time is set by the suspension processing unit (SPU) 48. When the road event miss confirmation is made, suspension control unit (SCU) 30 is programmed to check if another road event is approaching and release the threshold based pre-trigger and the threshold based suspension pre-setting if another road event is not approaching.

Both the event hit confirmation module 54 and the event miss confirmation module 56 are arranged in electronic communication with the cloud connection 40 and send either the road event hit confirmation or the road event miss confirmation to the cloud connection 40 for logging in the cloud-based network 46. This feedback, which is collected from multiple vehicles, is used to validate or update the pre-emptive event classification data that is stored in the cloud-based network 46 so that the stored information about road events remains current and accurate. Optionally, the event end confirmation module 58 may also be arranged in electronic communication with the cloud connection 40 and send information about the road event end confirmation to the cloud connection 40 for logging in the cloud-based network 46.

Figure 3:
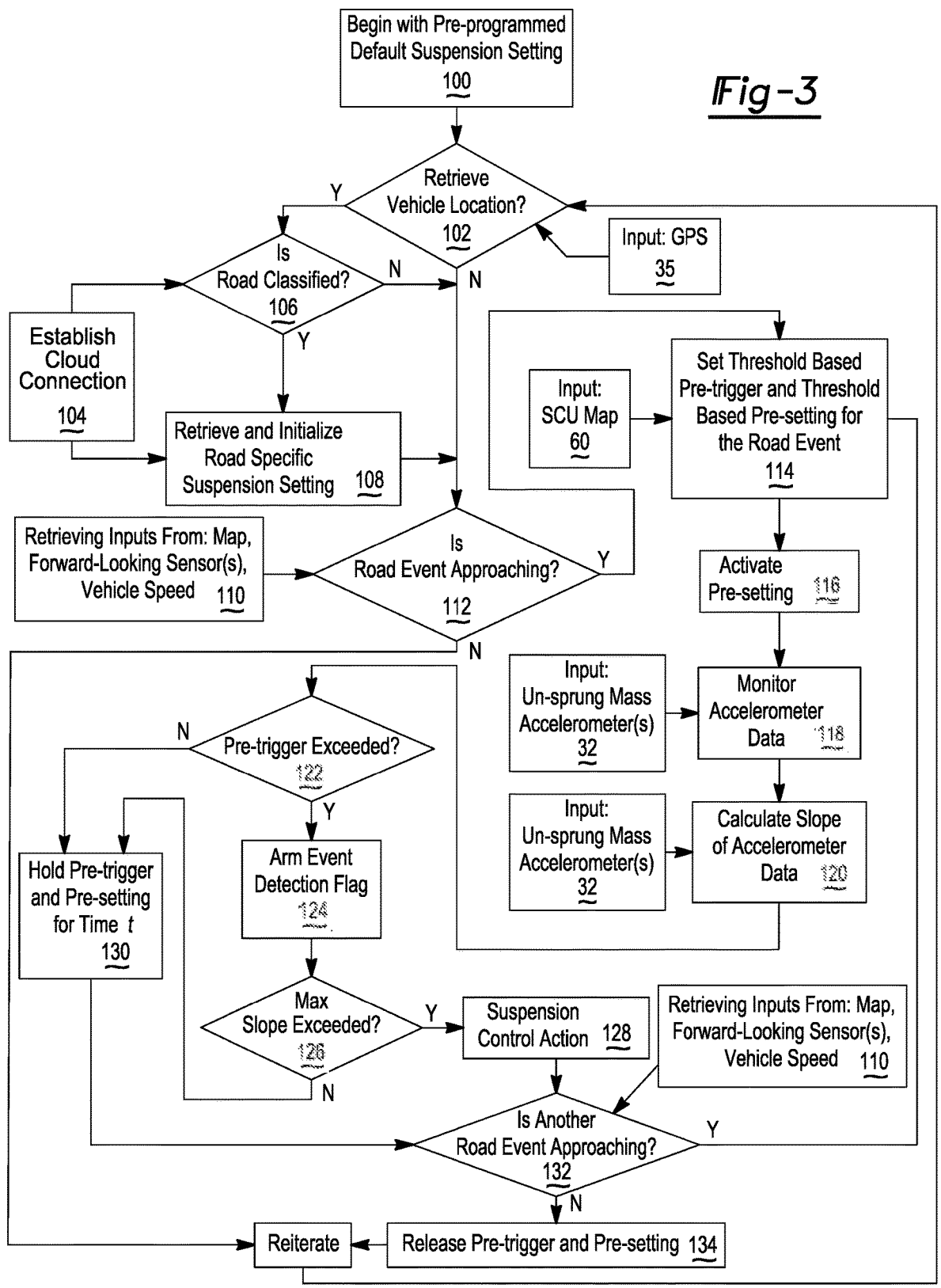
FIG. 3 is a flow diagram illustrating an exemplary method of controlling a suspension control system in accordance with the present disclosure.

FIG. 3 illustrates a method of controlling the suspension control system 20 described above. The method includes step 100, which involves programming a suspension control unit (SCU) 30 with one or more default suspension settings. The default suspension settings may be, for example, default settings or mappings for compression and rebound damping, which may be stored in the memory 44 of the suspension control unit (SCU) 30. These default suspension settings are utilized by the suspension control system 20 when no other suspension settings are available, such as when the vehicle 22 is traveling on an unclassified road, when the vehicle 22 is not approaching an identified road event, when vehicle location data is unavailable, when a connection to the cloud-based network 46 is unavailable, when sensor data from the forward looking sensor(s) 34 is unavailable, when acceleration and vehicle speed data is unavailable from the unsprung mass accelerometers 32, inertial measurement unit (IMU) 36, or powertrain control module (PCM) 38, or if system malfunctions or damage occurs.

The method includes step 102, which involves retrieving the vehicle 22 location data from the global positioning system (GPS) module 35 mounted in the vehicle 22. The method also includes step 104, which involves establishing a cloud connection 40 between the suspension control unit (SCU) 30 and the cloud-based network 46 and retrieving road classification data and pre-emptive event classification data from the cloud-based network 46. If the vehicle location data cannot be retrieved, then the method proceeds using the default suspension settings.

Once the vehicle's 22 location is retrieved and the cloud connection 40 is established, the suspension control unit (SCU) 30 performs step 106, which involves determining if the vehicle 22 is traveling on a classified stretch of road. This determination is based on the vehicle location data from the global positioning system (GPS) module 35 and the road classification data from the cloud connection 40. If the stretch of road the vehicle 22 is traveling on is classified, the suspension control unit (SCU) 30 performs step 108, which involves retrieving and initializing a road specific suspension setting based on the road classification data. As explained above, the road classification data may be represented on a numerical index or scale based on the roughness of the road surface and the road specific suspension setting may be a specific setting or mapping for compression and rebound damping that is selected based on the road classification data using a look-up table stored in the memory 44 of the suspension control unit (SCU) 30 or on the cloud based-network 46. Step 108 therefore involves switching from the default suspension setting to the road specific suspension setting that was retrieved. If the stretch of road the vehicle 22 is traveling on is not classified, then the method proceeds using the default suspension setting.

The method also includes step 110 of receiving sensor data about approaching road irregularities from the forward looking sensor(s) 34 mounted to the vehicle 22, receiving sprung mass acceleration data from the inertial measurement unit (IMU) 36, and receiving vehicle speed data from either the powertrain control module (PCM) 38 or directly from the vehicle speed sensor (VSS). At step 112, the pre-emptive road event classification module 50 of the suspension processing unit (SPU) 48 determines if a road event is approaching and generates pre-emptive road event classification information based on one or more of the following: the vehicle location data from the global positioning system (GPS) module 35, the pre-emptive event classification data from the cloud connection 40, vehicle speed data from the powertrain control module (PCM) 38 or the vehicle speed sensor (VSS), and the sensor data about approaching road irregularities from the forward looking sensor(s) 34. If no road event is approaching, then the suspension control system 20 goes back to the step of retrieving the vehicle location at a later point in time and reiterates the method.

When the pre-emptive road event classification module 50 of the suspension processing unit (SPU) 48 determines that a road event is approaching, the suspension processing unit (SPU) 48 performs step 114, which involves setting both a threshold based suspension pre-setting and a threshold based pre-trigger for the approaching road event based on the pre-emptive road event classification information. As explained above, the pre-emptive road event classification information may include information that a road event is approaching, the expected location, distance, or time of the road event, and the classification for the road event. The threshold based pre-trigger, which is set by the threshold based pre-trigger module 52, may be an acceleration value or measurement that represents a certain threshold level above the normal level of acceleration values expected for roadway travel in general or the specific stretch of road the vehicle 22 is traveling on given the road classification data. The threshold based pre-trigger may be stored in the memory 44 of the suspension control unit (SCU) 30 in a look-up table, for example. The threshold based suspension pre-setting, which is set by the suspension control unit (SCU) map module 60, may be a specific pre-setting or mapping for compression and rebound damping that is selected when the pre-emptive road event classification information reaches a certain threshold or multiple threshold levels, which may be stored in the memory 44 of the suspension control unit (SCU) 30 in a look-up table.

After step 114 is performed, the suspension control unit (SCU) 30 performs step 116 to activate the threshold-based suspension pre-setting for the road event, which may different than the default suspension setting set at step 100 and the road specific suspension setting set at step 108. The method proceeds with step 118, which involves receiving unsprung mass acceleration data from the unsprung mass accelerometers 32 positioned at each wheel 24 of the vehicle 22 and monitoring the unsprung mass acceleration data, including monitoring any peaks in the unsprung mass acceleration data. The suspension processing unit (SPU) 48 also performs step 126 of calculating a slope value for the unsprung mass acceleration data. At step 122, the suspension processing unit (SPU) 48 calculates a hold time t based on the vehicle location data and the vehicle speed data (and optionally, the uncertainty/accuracy of the event location and a safety factor) and determines if the unsprung mass acceleration data exceeds the threshold based pre-trigger during a period of time corresponding to the hold time t. If such a determination is made, the suspension processing unit (SPU) 48 performs step 124 of arming an event detection flag.

When the event detection flag is armed, the suspension processing unit (SPU) 48 performs step 126 of determining if the slope value that was calculated exceeds a maximum slope value. If such a determination is made, the event hit confirmation module 54 generates a road event hit confirmation and the suspension control unit (SCU) 30 performs step 128 of activating a suspension control action for the road event, which specifically tailors the adaptive suspension settings to better absorb the impact of the road event on the suspension and improve ride comfort.

If a road event hit confirmation is made, the event end confirmation module 58 monitors the sprung mass acceleration data from the inertial measurement unit (IMU) 36 or sprung mass accelerometers and generates a road event end confirmation based on the sprung mass acceleration data. By way of example and without limitation, the event end confirmation module 58 may determine the road event has ended when the sprung mass acceleration data remains below a threshold value for a pre-defined period of time, values which may be stored in the memory 44 of the suspension control unit (SCU) 30 as a default value or an index of values in a look-up table. Alternatively, the threshold value may be retrieved from the cloud-based network 46 and passed as part of the pre-emptive event classification information and pre-defined period of time may be calculated by the processor 42 of the suspension control unit (SCU) 30 based at least in part on the vehicle speed data, for example.

At step 130, both the threshold based pre-trigger and the threshold based suspension pre-setting are held in the suspension control unit (SCU) 30 for the hold time t. If the unsprung mass acceleration data does not exceed the threshold based pre-trigger and/or the maximum slope value during the hold time t, the event miss confirmation module 56 generates a road event miss confirmation. Once either a road event end confirmation or road event miss confirmation is made, the method proceeds with step 132 of determining if another road event is approaching based on one or more of the following: the vehicle location data from the global positioning system (GPS) module 35, the pre-emptive event classification data from the cloud connection 40, vehicle speed data from at least one of the powertrain control module (PCM) 38 and the vehicle speed sensor (VSS), and the sensor data about approaching road irregularities from at least one of the forward looking sensors 34. If another road event is approaching, the suspension control unit (SCU) 30 will hold the threshold based pre-trigger and the threshold based suspension pre-setting and go back to step 114 of setting the threshold based pre-trigger and threshold based pre-setting for the road event. On the other hand, if the determination is made that no road event is approaching, the suspension control unit (SCU) 30 performs step 134, which involves releasing both the threshold based pre-trigger and the threshold based suspension pre-setting. When this occurs, the suspension control system 20 goes back to step 102 of retrieving the vehicle location at a later point in time and reiterates the method. Optionally, the method may include communicating either the road event hit confirmation or the road event miss confirmation to the cloud-based network 46 for logging.

Thus, it should be appreciated that the suspension control system 20 of the present disclosure provides a total of four different operating modes, which may be summarized as: (1) a default control mode—the adaptive suspension component(s) 26 operate using the default suspension setting provided at step 100, (2) a road specific control mode—the adaptive suspension component(s) 26 operate using the road specific suspension setting provided at step 108, (3) a pre-setting control mode—the adaptive suspension component(s) 26 operate using the threshold based pre-setting provided at step 116, and (4) active control mode—the adaptive suspension component(s) 26 are dynamically adjusted by the suspension control action provided at step 128.

Many modifications and variations of the present disclosure are possible in light of the above teachings and may be practiced otherwise than as specifically described while within the scope of the appended claims.

What is claimed is:
1. A suspension control system for a vehicle comprising:
   one or more adaptive suspension components connected to the vehicle, each having one or more adaptive suspension settings;
   a suspension control unit (SCU) that is arranged in electronic communication with said adaptive suspension components;

an unsprung mass accelerometer positioned at each wheel of the vehicle, where each unsprung mass accelerometer is arranged in communication with said suspension control unit (SCU) and is configured to provide unsprung mass acceleration data to said suspension control unit (SCU);

a global positioning system (GPS) module mounted in the vehicle that is arranged in communication with said suspension control unit (SCU) and configured to provide vehicle location data to said suspension control unit (SCU);

said suspension control unit (SCU) is programmed to determine if a road event is approaching based on said vehicle location data and provide pre-emptive road event classification information for an approaching road event;

said suspension control unit (SCU) is programmed to set both a threshold based suspension pre-setting and a threshold based pre-trigger based on said pre-emptive road event classification information;

said suspension control unit (SCU) is programmed to monitor said unsprung mass acceleration data and calculate a slope value for said unsprung mass acceleration data; and said suspension control unit (SCU) is configured to generate a control signal that changes said adaptive suspension settings of said adaptive suspension components if said unsprung mass acceleration data exceeds said threshold based pre-trigger and said slope value that is calculated by said suspension control unit (SCU) exceeds a maximum slope value.

2. The suspension control system set forth in claim 1, wherein said threshold based pre-trigger corresponds to an acceleration value and wherein said suspension control unit (SCU) is programmed to calculate a hold time based at least in part on said vehicle location data and vehicle speed data.

3. The suspension control system set forth in claim 2, wherein said suspension control unit (SCU) is programmed to monitor said unsprung mass acceleration data and release said threshold based pre-trigger and said threshold based suspension pre-setting for said road event if said unsprung mass acceleration data does not exceed said threshold based pre-trigger and if said slope value calculated by said suspension control unit (SCU) does not exceed said maximum slope value during said hold time.

4. The suspension control system set forth in claim 3, further comprising:
at least one of a sprung mass accelerometer and an inertial measurement unit (IMU), mounted in the vehicle, that is arranged in communication with said suspension control unit (SCU) and configured to provide sprung mass acceleration data to said suspension control unit (SCU), and
said suspension control unit (SCU) is programmed to monitor said sprung mass acceleration data, make a road event end confirmation, and release said threshold based pre-trigger and said threshold based suspension pre-setting for said road event based on said sprung mass acceleration data.

5. The suspension control system set forth in claim 2, wherein said suspension control unit (SCU) receives said vehicle speed data from at least one of a powertrain control module (PCM) and a vehicle speed sensor (VSS).

6. The suspension control system set forth in claim 1, further comprising:
said suspension control unit (SCU) including a processor configured to control said adaptive suspension settings of said adaptive suspension components and memory programmed with one or more default suspension settings,
wherein said threshold based suspension pre-setting and said default suspension settings include settings for at least one of compression damping and rebound damping.

7. The suspension control system set forth in claim 6, wherein said suspension control unit (SCU) includes pre-emptive road event classification data stored in said memory.

8. The suspension control system set forth in claim 1, further comprising:
a cloud connection that is arranged in communication with said suspension control unit (SCU) and a cloud-based network and configured to provide pre-emptive event classification data to said suspension control unit (SCU).

9. A suspension control system for a vehicle comprising:
one or more adaptive suspension components connected to the vehicle, each having one or more adaptive suspension settings;
a suspension control unit (SCU) that is arranged in electronic communication with said adaptive suspension components;
an unsprung mass accelerometer positioned at each wheel of the vehicle, where each unsprung mass accelerometer is arranged in communication with said suspension control unit (SCU) and is configured to provide unsprung mass acceleration data to said suspension control unit (SCU);
at least one forward looking sensor mounted to the vehicle that is arranged in communication with said suspension control unit (SCU) and configured to provide sensor data about approaching road irregularities to said suspension control unit (SCU);
said suspension control unit (SCU) is programmed to determine if a road event is approaching based on said sensor data and provide pre-emptive road event classification information for an approaching road event;
said suspension control unit (SCU) is programmed to set both a threshold based suspension pre-setting and a threshold based pre-trigger based on said pre-emptive road event classification information;
said suspension control unit (SCU) is programmed to monitor said unsprung mass acceleration data and calculate a slope value for said unsprung mass acceleration data;
said suspension control unit (SCU) is programmed to arm an event detection flag if said unsprung mass acceleration data exceeds said threshold based pre-trigger; and
said suspension control unit (SCU) is configured to generate a control signal that changes said adaptive suspension settings of said adaptive suspension components if said unsprung mass acceleration data exceeds said threshold based pre-trigger and said slope value that is calculated by said suspension control unit (SCU) exceeds a maximum slope value.

10. The suspension control system set forth in claim 9, wherein said threshold based pre-trigger corresponds to an acceleration value and wherein said suspension control unit (SCU) is programmed to calculate a hold time based at least in part on vehicle speed data.

11. The suspension control system set forth in claim 10, wherein said suspension control unit (SCU) is programmed to monitor said unsprung mass acceleration data and release said threshold based pre-trigger and said threshold based suspension pre-setting for said road event if said unsprung mass acceleration data does not exceed said threshold based pre-trigger and if said slope value calculated by said suspension control unit (SCU) does not exceed said maximum slope value during said hold time.

12. The suspension control system set forth in claim 11, further comprising:
at least one of a sprung mass accelerometer and an inertial measurement unit (IMU), mounted in the vehicle, that is arranged in communication with said suspension control unit (SCU) and configured to provide sprung mass acceleration data to said suspension control unit (SCU), and
said suspension control unit (SCU) is programmed to monitor said sprung mass acceleration data, make a road event end confirmation, and release said threshold based pre-trigger and said threshold based suspension pre-setting for said road event based on said sprung mass acceleration data.

13. The suspension control system set forth in claim 10, wherein said suspension control unit (SCU) receives said vehicle speed data from at least one of a powertrain control module (PCM) and a vehicle speed sensor (VSS).

14. The suspension control system set forth in claim 9, further comprising:
said suspension control unit (SCU) including a processor configured to control said adaptive suspension settings of said adaptive suspension components and memory programmed with one or more default suspension settings,
wherein said threshold based suspension pre-setting and said default suspension settings include settings for at least one of compression damping and rebound damping.

15. A method of controlling a suspension system for a vehicle, comprising the steps of:
receiving unsprung mass acceleration data from an unsprung mass accelerometer positioned at each wheel of the vehicle;
retrieving vehicle location data from a global positioning system (GPS) module mounted in the vehicle;
establishing a connection to a cloud-based network and retrieving pre-emptive event classification data from the cloud-based network;
determining if a road event is approaching and generating pre-emptive road event classification information based at least in part on the vehicle location data from the global positioning system (GPS) module and the pre-emptive event classification data from the cloud connection;
setting both a threshold based suspension pre-setting and a threshold based pre-trigger for an approaching road event based on the pre-emptive road event classification information;
monitoring the unsprung mass acceleration data and calculating a slope value for the unsprung mass acceleration data when an event detection flag is armed; and
activating a suspension control action for the road event if both the unsprung mass acceleration data exceeds the threshold based pre-trigger and the slope value that was calculated for the unsprung mass acceleration data exceeds a maximum slope value.

16. The method set forth in claim 15, further comprising the steps of:
arming the event detection flag if the unsprung mass acceleration data exceeds the threshold based pre-trigger;
calculating a hold time based on the vehicle location data and vehicle speed data; and
monitoring the unsprung mass acceleration data and releasing both the threshold based pre-trigger and the threshold based suspension pre-setting if the unsprung mass acceleration data does not exceed the threshold based pre-trigger and the maximum slope value during the hold time.

17. The method set forth in claim 16, further comprising the step of:
receiving the vehicle speed data from at least one of a powertrain control module (PCM) and a vehicle speed sensor (VSS) mounted in the vehicle.

18. The method set forth in claim 15, further comprising the steps of:
receiving sprung mass acceleration data from at least one of a sprung mass accelerometer and an inertial measurement unit (IMU) mounted in the vehicle; and
monitoring the sprung mass acceleration data, generating a road event end confirmation, and releasing both the threshold based pre-trigger and the threshold based suspension pre-setting based on the sprung mass acceleration data.

19. The method set forth in claim 15, further comprising the steps of:
receiving sensor data about approaching road irregularities from at least one forward looking sensor mounted to the vehicle; and
determining if a road event is approaching and generating pre-emptive road event classification information based at least in part on the sensor data.

20. The method set forth in claim 15, further comprising the steps of:
programming a suspension control unit (SCU) with one or more default suspension settings;
retrieving road classification data from the cloud-based network;
determining if the vehicle is traveling on a classified stretch of road based on the vehicle location data from the global positioning system (GPS) module and the road classification data from the cloud connection; and
retrieving a road specific suspension setting based on the road classification data if the stretch of road the vehicle is traveling on is classified.

* * * * *